UNITED STATES PATENT OFFICE.

CHARLES J. REED, OF PHILADELPHIA, PENNSYLVANIA.

PROCESS OF SEPARATING HETEROGENEOUS SUBSTANCES AND DETINNING SCRAP.

971,405.   Specification of Letters Patent.   Patented Sept. 27, 1910.

No Drawing. Application filed June 19, 1909, Serial No. 503,166. Renewed February 28, 1910. Serial No. 546,547.

*To all whom it may concern:*

Be it known that I, CHARLES J. REED, a citizen of the United States, residing at Philadelphia, in the county of Philadelphia and State of Pennsylvania, have invented certain new and useful Improvements in Processes of Separating Heterogeneous Substances and Detinning Scrap, of which the following is a specification.

This process is applicable to the separation of the constituents of mixtures, as for example mixtures of non-adhering particles of scrap metals or alloys, such as chips, turnings, borings or filings of copper or brass mixed with babbitt, lead or tin; or metal scrap coated with an adhering metal, such as tinned iron or copper, galvanized iron, metal carrying solder, or electroplated metal; or non-metallic mixtures such as cloth and rubber.

The process comprises three steps, to wit:—first, pulverizing the component which is softer, weaker, or less cohesive, by agitating a charge containing the mixed substances and a subdivided magnetic substance; second, mechanically separating the pulverized and unpulverized substances; and third, magnetically separating the magnetic substance. The order of the second and third steps is variable with different materials.

In carrying out the first step in the separation of metals, advantage is taken of the fact that the metallic component to be pulverized is usually the more fusible one, and that it may be rendered more soft, weak and friable by heating the charge, preferably to about the melting point of this metal.

The subdivided magnetic substance used to abrade and pulverize the soft and weak substance may either be one which is initially magnetic, for example pieces of iron, nickel, cobalt, or magnetic iron oxid, or one which becomes magnetic upon heating, for example hematite or siderite. It is preferably, though not necessarily, a substance which is inert toward and will not react or combine with nor melt and coat either of the mixed substances. It not only acts to pulverize the less cohesive component, but also to separate and prevent the reunion of the particles of pulverized substance. The fineness or extent of subdivision of the magnetic substance is variable with different materials. When used to remove coating metals, as for example tin from tinned iron, it is preferably finely divided, so as to enter all the depressions and crevices of the scrap and rub off all of the tin. The amount of the magnetic substance added to the charge is also variable, proportions of one of the magnetic material to one-tenth of the mixed substances, also one of the magnetic material to ten or more of the mixed substances having been used. In general, an amount equal to or greater than the volume of the mixed substances is desirable.

The apparatus used in carrying out the first step of the process may be a movable vessel or agitator of any convenient size and shape, for example a rumble or rotating cylinder, or a shaking pan. The charge of mixed substances and the magnetic material may either be preheated, or may be continuously heated in the agitator, preferably in the case of metals to the point of incipient fusion of the softer metal.

The apparatus preferred for carrying out the second and third steps of the process comprises a screen for mechanically separating the unpulverized and pulverized substances, and a magnetic separator for removing the added magnetic material. When hematite is used as a pulverizing material, it is heated to render it magnetic, before or at the time of its removal.

The following are specific illustrations of the process:

1. A body of tin scrap is mixed with an equal volume of finely-divided magnetite and the mixture is charged into a rumble, wherein it is subjected to heat and agitation until the tin is entirely removed from the iron. The initial product is then thrown upon a screen, which separates the pieces of detinned iron from the powdered tin and magnetite. The magnetite is then removed from the tin by a magnetic separator.

2. To a mixture of brass and babbitt is added twice its volume of subdivided magnetite. The mixture is heated and agitated in a rumble until the babbitt is pulverized. The magnetite is then magnetically removed from the brass and powdered babbitt, and the brass is finally separated from the babbitt by a screen.

The word "metals," as used in the claims, is intended to include alloys; the term "magnetic material," to include substances which are either initially paramagnetic or become so when heated; and the term "mixed metals" is intended to include metals which are either adherent or non-adherent.

I claim:

1. The process of separating mixed heterogeneous substances, which consists in pulverizing one substance by a subdivided magnetic material, and then magnetically removing the magnetic material and separating the pulverized from the unpulverized material.

2. The process of separating mixed heterogeneous substances, which consists in pulverizing one substance by heat and a subdivided magnetic material, and then magnetically removing the magnetic material and separating the pulverized from the unpulverized material.

3. The process of separating mixed metals, which consists in pulverizing one metal by a subdivided magnetic material, and then magnetically removing the magnetic material and separating the pulverized metal from the unpulverized metal.

4. The process of separating mixed metals, which consists in pulverizing one metal by heat and a subdivided magnetic material, and then magnetically removing the magnetic material and separating the pulverized metal from the unpulverized metal.

5. The process of separating mixed metals, which consists in pulverizing one metal by agitating a charge containing the mixed metals and an added magnetic material, and then mechanically separating the pulverized and unpulverized metals and magnetically removing the magnetic material.

6. The process of separating mixed metals, which consists in pulverizing one metal by heating and agitating a charge containing the mixed metals and an added magnetic material, and then mechanically separating the pulverized and unpulverized metals and magnetically removing the magnetic material.

7. The process of detinning tinned iron scrap, which consists in mixing the scrap with a finely-divided magnetic material, heating and agitating the mixture, mechanically separating the pulverized tin and detinned iron, and magnetically removing the magnetic material.

8. The process of detinning tinned-iron scrap, which consists in mixing the scrap with finely-divided magnetite, heating and agitating the mixture, screening the detinned iron from the pulverized tin and magnetite, and magnetically removing the magnetite from the tin.

In testimony whereof, I affix my signature in presence of two witnesses.

CHARLES J. REED.

Witnesses:
ELLEN M. RITTER,
MARY A. McCONEGHY.